Nov. 28, 1967     R. A. MORSE     3,354,953
RECOVERY OF OIL FROM RESERVOIRS
Filed June 14, 1952                 3 Sheets-Sheet 1

RICHARD A. MORSE
    INVENTOR.

BY  Goodwin

ATTORNEY

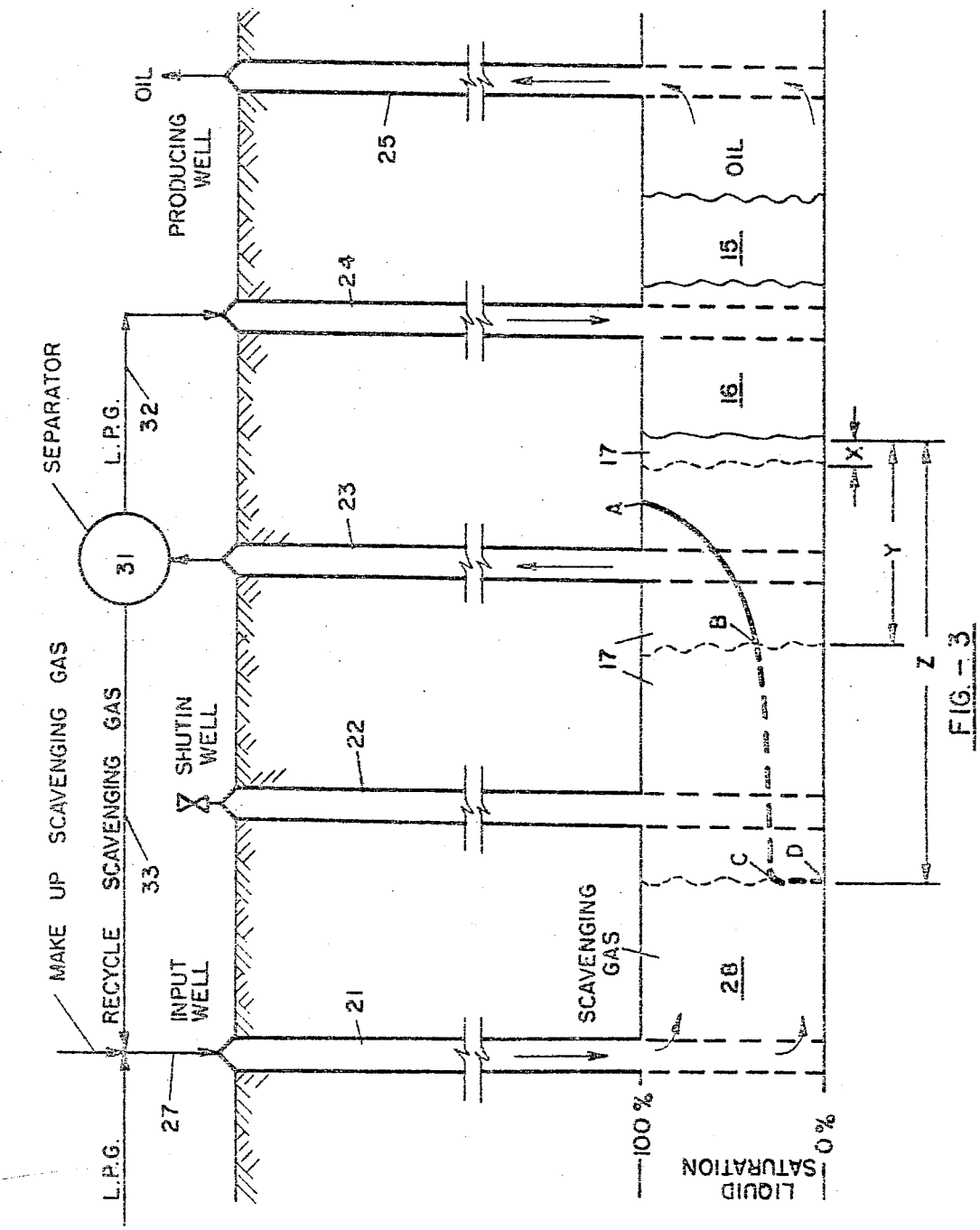

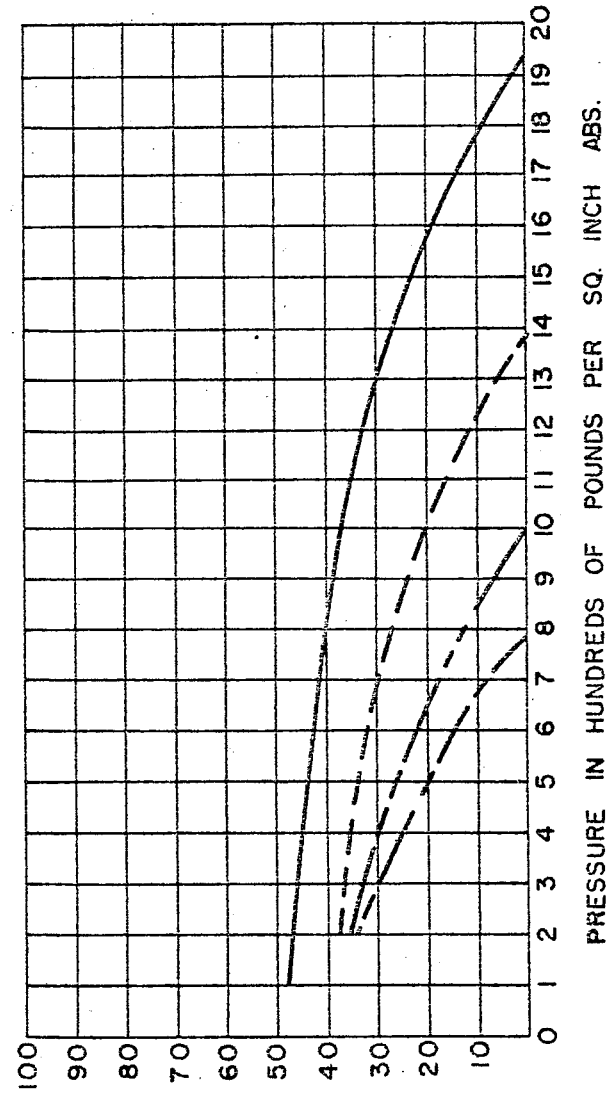

United States Patent Office 3,354,953
Patented Nov. 28, 1967

3,354,953
RECOVERY OF OIL FROM RESERVOIRS
Richard A. Morse, Tulsa, Okla., assignor to Pan American Petroleum Corporation, a corporation of Delaware
Filed June 14, 1952, Ser. No. 293,544
16 Claims. (Cl. 166—9)

This application is a continuation-in-part of my copending application Ser. No. 176,168, filed July 27, 1950, now abandoned.

This invention pertains to a process for increasing the recovery of oil from reservoirs. More particularly, this invention pertains to a method of recovery from subterranean oil producing formations by which for the first time substantially all of the oil in a formation may be displaced by a less valuable fluid.

In the primary recovery of oil by water drive, gas drive, gravity drive, and the like, the natural forces available in the reservoir move the oil to the producing well, and no external energy is applied to the reservoir. The oil recovery by these primary processes, severally and in combination, is relatively poor and the efficiency very low—a large and usually a major part of the oil being left in the reservoir. Secondary recovery is sometimes used to decrease the amount of this remaining oil. In secondary recovery, as the term is normally used in the art, external energy, as distinguished from the natural reservoir forces, is applied to drive the oil from the reservoir. A displacing or driving fluid is injected into the reservoir via an input well, and moves along the reservoir through the pores and connecting capillaries to the producing well, displacing or removing a part of the oil from the pores and carrying it to the producing well. The displacing fluid, which is generally water or natural gas, cannot displace all of the oil in a reservoir, as is well known in this art. That is, displacement can never be complete, since the actual amount of oil displacement depends upon the relative ease with which the oil and the displacing fluid can move through the reservoir and since the ease with which the oil is displaced through the reservoir decreases as the oil saturation decreased. As displacement begins, the oil saturation being high and the displacing fluid saturation being low, oil will flow readily since the permeability to oil is high, and the displacing fluid will flow with greater difficulty. As displacement proceeds, permeability to oil continuously decreases, and permeability to the displacing fluid continuously increases. Eventually a point is reached at which the permeability to the displacing fluid is relatively high and the amount of oil removed from the reservoir by the displacing fluid is so low that the reservoir can no longer be economically produced. In the case where a gas is the displacing fluid, this ultimate recovery of oil is generally limited to between about 15 and about 30 percent of the oil originally in place. Where water is the displacing fluid, the economic limit of secondary recovery is generally better; being between about 40 and about 65 percent of the oil originally in place in the reservoir. Various methods have been proposed for improving this ultimate recovery, but no completely satisfactory process has been proposed.

It is an object of this invention to provide an improved method of secondary recovery of oil. A further object of this invention is to provide a method of producing substantially all of the oil in a reservoir by use of a certain sequence of displacing fluids. These and other objects of this invention will become apparent from the following description in which reference will be made to the accompanying drawings. In these drawings:

FIGURE 3 is a diagrammatic representation of a cross section of a reservoir showing in greater detail the same secondary recovery process shown in FIGURE 2; and, FIGURE 4 is a graph showing the effect of displacement pressure on the amount of various liquids left in a reservoir when various driving gases are used.

I have discovered that the oil in a reservoir may be displaced substantially completely by a liquid which is miscible with that oil and that a mixing or transition zone forms between the oil and the oil-miscible liquid which is relatively short. I have also discovered that this short transition zone between pure oil and the oil-miscible liquid develops within a short time after the solvent or oil-miscible liquid is first injected into a reservoir. The thickness, that is, the radial length or dimension in the direction of flow, of this transition zone appears to become about constant within a short distance of travel through the reservoir near the injection well, and thereafter never increases or decreases appreciably as the zone progresses from the input to the producing well. Gravitational forces and forces of diffusion between the oil and the solvent tend to disperse the solvent throughout the reservoir, but these forces, I find, act so slowly at ordinary rates of drive, i.e., at a rate of the order of $1/100$ to $10$ feet/day that their effects are practically negligible. This transition zone from pure oil to pure solvent appears to form almost immediately, producing a front or oil bank which, as discussed above, increase substantially the permeability of the reservoir to oil at that point. Then, apparently due to this high permeability and the phenomenon of miscible fluid displacement, the miscible liquid or solvent does not tend to bypass the oil, and the oil is displaced ahead of the solvent, somewhat similar to a frontal drive but different in that substantially all oil is displaced. As mentioned above, the thickness of the transition zone from pure oil to pure solvent tends to remain substantially constant regardless of minor changes in the reservoir rock. Accordingly, all of the oil could be displaced from a reservoir by a miscible fluid with very little contamination of either. Suitable oil-miscible fluids, are, however, generally too expensive to use in place of the customary secondary recovery fluids which unfortunately are not oil miscible since these solvents are generally of the same or of higher value than the oil which they displace. The use of such solvents in customary secondary recovery operations is therefore impractical. In accordance with this invention in which the contiguous fluids the miscible to an appreciable extent, only a small percent of solvent—generally between about 3 and about 10 percent of the pore volume of a reservoir—is required to produce a stable mixing zone. This solvent band is then driven through the reservoir with another fluid with which the solvent is also miscible to displace the oil completely from the reservoir.

Figure 1:
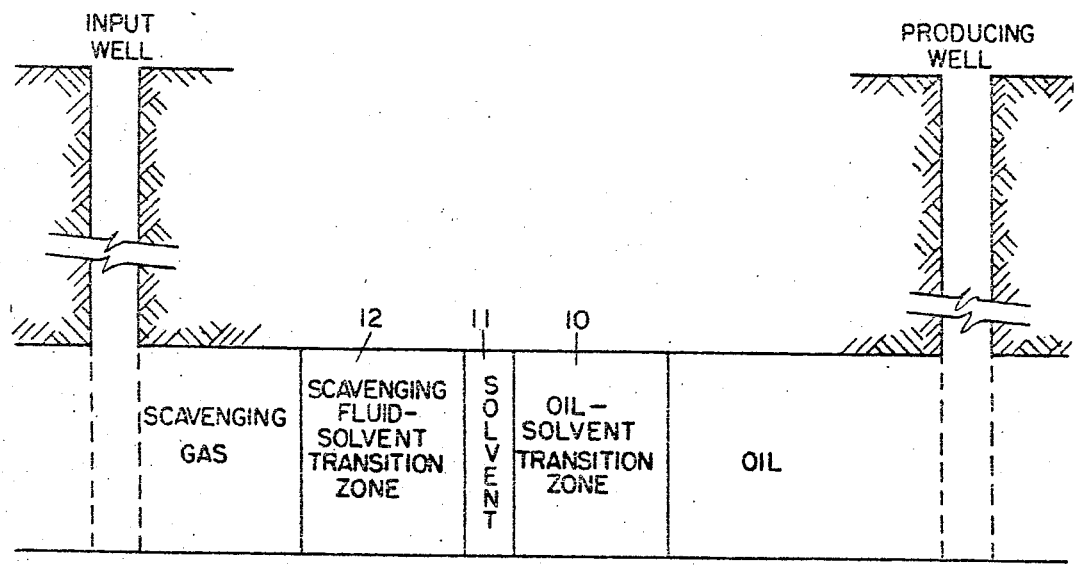
FIGURE 1 is a diagrammatic representation of a cross section of a reservoir between an input and a producing well showing the method by which oil is removed completely from a reservoir, with an ultimate scavenging fluid.

Referring now to FIGURE 1, a liquid solvent for oil is first injected into a well under a pressure above the vapor pressure of the solvent. The first of this liquid solvent immediately contacts the oil in the reservoir, mixing with it and moving roughly radially outward from the injection well. As time goes on, this solvent forms with the reservoir oil an oil-solvent transition zone 10 in which the composition of the components varies from 100 percent oil at the leading edge to 100 percent solvent at the trailing edge. Tests show that the thickness of this transition zone appears to stabilize within a few feet of the input well and does not vary as the solvent progresses through the reservoir from the input well to the producing well. Therefore, assuming a surplus of solvent is injected into the well, a zone 11 of substantially uncontaminated or pure solvent follows the oil-solvent transition zone 10. In the case of linear flow, as, for example, in "shoe string" oil reservoirs, the amount of solvent injected into the input well is sufficient only to provide in addition to the oil-solvent transition zone 10 and a scavenging fluid-solvent transition zone 12 a narrow pure solvent zone 11, so that most of the solvent goes into the transition zones. That is, a thick bank of surplus solvent 11 following the oil-solvent transition zone 10 is unnecessary. In the case of radial flow, however, as, for example, in a "five-spot" secondary recovery operation, the thickness of the pure solvent band is greater near the input well and gradually decreases as the length of the band increases. In a five-spot pattern when the transition zone 10 has been extended so that such zones from adjacent injection wells are in contact, the circumferential length of the transition zone is greatest. The thickness of the transition zones remains substantially constant, so that the amount of solvent required to provide a transition zone of the same thickness as when formed is substantially greater at this time. This amount of solvent is, therefore, initially added as surplus. The total amount of solvent varies in general as the pore space in the reservoir, miscibility of the fluids, etc. It is often desirable to make pilot tests on simulated cores with reservoir fluids and the scavenging fluid to determine the amount of solvent required.

When the calculated amount of solvent required to produce a narrow but continuous pure solvent zone 11 has been injected into a reservoir, a scavenging fluid is introduced into the reservoir through the same input wells, displacing the oil-solvent transition zone 10 and the pure solvent zone 11 back into the reservoir. This scavenging fluid may be any inexpensive liquid or gas as above described; but, in order to recover the solvent, it must be selected on the basis of the mechanism of miscible fluid displacement of the pure solvent zone. As in the case of displacing oil with solvent, the scavenging fluid displaces solvent completely, producing a scavenging fluid-solvent transition zone 12. Since the solvent constitutes the major expense of this process, it and the scavenging fluid are selected on the basis of miscibility and diffusivity with each other and with the oil so that the respective transition zones have a minimum thickness, whereby the minimum amount of solvent is required.

In one embodiment of the invention as above described, the scavenging fluid is a gas—typically natural gas—containing a substantial proportion (e.g., 80 to 95 percent) of methane, the remainder being principally ethane, with a very minor proportion of propane, butane, etc. The effluent gas from a gasoline plant is a very desirable scavenging gas. A solvent miscible with both the oil and with this gas is first injected into the reservoir through the input well. This solvent may be any of a number of oil solvents; for example, any of the intermediate substantially pure hydrocarbons—hydrocarbons in the range of $C_3$ to $C_6$ or mixtures thereof. Particularly desirable solvents of this type are any of the mixtures known commercially as liquified petroleum gas, and sometimes hereinafter referred to as L.P.G. These mixtures, as is well-known, consist principally of propane and butane with minor proportions of ethane, pentane, and possibly very minor proportions of methane, and hexane and heavier hydrocarbons. Other suitable solvents are natural gasoline or narrow cuts of refined light petroleum hydrocarbons, such as gasoline, kerosene, naphtha, or the like. Carbon tetrachloride, carbon disulfide, the chlorinated hydrocarbons, and other well-known oil solvents are within the purview of this invention, provided only that the solvent is liquid at injection pressure and miscible with both the oil and the scavenging gas. Mixtures of these solvents are many times desirable, particularly in view of the improvements obtained by controlling the viscosity of the solvent. That is, I have found that the length of a transition zone, particularly with horizontal flow, varies inversely as the ratio of the viscosities of driven to driving fluid. Thus, the driving fluid is preferably more viscous than the driven fluid, and it has been found that in some cases, depending upon the oil, various combinations of solvents give a shorter transition zone in long horizontal cores than a single solvent. For example, a small amount of acetone may be combined with L.P.G. to decrease the viscosity ratio of solvent to scavenging fluid and thereby to displace the solvent from the pores of the reservoir with a thinner transition zone 12.

Figure 2:
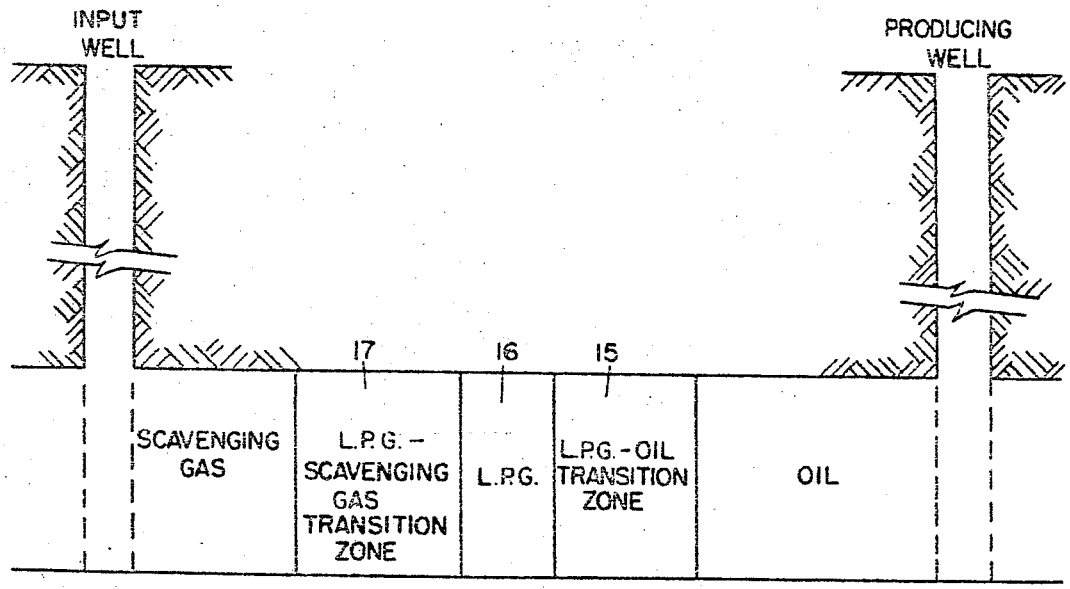
FIGURE 2 represents a similar situation in which the scavenging fluid is a gas.

Referring now to FIGURE 2 for a description of my process with preferred fluids, first, liquid L.P.G. is injected into the input well. Being miscible with the oil, a liquid L.P.G.-oil transition zone 15 is established, displacing substantially all of the oil by frontal drive through the reservoir and leaving behind a band 16 of nearly pure liquid L.P.G. Sufficient liquid L.P.G. is injected into the input well to assure maintaining the equilibrium thickness of the L.P.G.-oil transition zone and L.P.G.-scavenging gas transition zone 17 at all times during the drive, and then the L.P.G. may be followed by a scavenging gas. The amount of L.P.G. injected is desirably between about 3 and about 10 percent, typically 5 percent, of the pore volume of the reservoir. The scavenging gas, which is preferably natural gas in the case of an L.P.G. solvent, then produces with the liquid L.P.G. a transition zone 17 varying gradually from liquid L.P.G. to relatively pure scavenging gas—the concentration of the L.P.G. gas being greatest at the leading edge of the zone and gradually decreasing to zero at the trailing edge of the zone. By continued injection of the scavenging gas, these transition zones are driven across the reservoir in bands which, under most conditions, became stabilized in thickness within a few feet from the input well. That is, as described above, as the bands spread out from the input well, the circumferential lengths of the bands increase and the thickness of the pure solvent band 11 decreases. Preferably, the pure solvent band nearly disappears when the maximum circumferential lengths of transition zones 15 and 17 occur.

After the pure solvent band has reached the producing well, further injection of scavenging gas is unnecessary, since the gas in the pores is generally sufficiently volatile to flow to the wells if it can be economically produced.

It will be apparent that, in some cases, a constituent which tends to make the scavenging gas more miscible with the solvent which it follows may be incorporated in the leading edge of the scavenging gas. Thus, for example, in some cases, I may inject into the reservoir immediately after the solvent carbon dioxide or a natural gas relatively rich in hydrocarbons within the solvent range. For example, I may inject a natural gas containing substantial quantities of ethane, propane, butane, and higher hydrocarbons in order to promote the mixing of liquid L.P.G. and natural gas scavenging fluid and thereby decrease the thickness of the transition zone 17 and the amount of liquid L.P.G. required. This enriched gas is then followed by a dry natural gas containing little ethane or higher hydrocarbons, or by any other gas miscible with the enriched gas.

The scavenging gas in injected into the input well at a rate which causes the solvent band to progress across the reservoir at the preferred rate, typically at about one foot per day. The pressure of the input scavenging gas will vary generally indirectly as the permeability of the reservoir. The input gas pressure may also be controlled by injecting a quantity of water or other liquid which decreases the permeability of the reservoir, etc., or by controlling the pressure on the producing wells. It is generally more economical to maintain a minimum back pressure on the producing well and thus produce the reservoir with a minimum input gas pressure. Efficiency and economic recovery, however may be improved in some cases by increasing the pressure in the reservoir and injecting the scavenging gas at high pressure. I have found, for example, that, at low pressure, gas may break through to the producing well before all of the solvent is recovered and additional gas has to be injected to recover all of the solvent. A higher recovery of solvent is often obtained without cycling additional gas through the reservoir by maintaining the pressure in the solvent-scavenging gas transition zone above the pressure at which the solvent and scavenging gas exist as two phases, i.e., by maintaining the transition zone 17 under conditions of reservoir temperature at such a pressure that no phase change will occur over the complete composition range from pure solvent to pure scavenging gas. At this pressure, the L.P.G.-scavenging gas transition zone will advance across the reservoir as a narrow zone equivalent to a liquid-liquid transition zone. Such a transition zone may be as short as a few feet, typically 2–10 feet and like the liquid-liquid transition zones 10 and 15, the length will become stabilized within a few feet from the input well. The length of this zone, when the L.P.G. and scavenging gas are maintained at a pressure in the single phase region, is indicated by the distance X in FIGURE 3. For comparison, the length of the transition zone for the same materials at low pressure is indicated by the distance Z.

In any two-component fluid system, when the pressure at any particular temperature is higher than the pressure at which two phases, a gas and a liquid phase, exist, there is only one phase, in this reservoir, a fluid phase in which the components act like a single component. When this condition exists at the scavenging fluid-solvent transition zone, there is no liquid left in the reservoir at gas breakthrough. This critical pressure of any complex mixture at any desired temperature can be found in the literature or can be determined by experiment, as is well known in the art. The effect of pressure on the length of a liquid-gas transition zone for a number of two-component systems namely, butane-methane, propane-methane, propane-carbon dioxide, and propane-ethane is shown in FIGURE 4. When the pressure in the transition zone is below the single phase pressure for the particular multicomponent system, there is free gas intermingled with the liquid in the pores. The relative volumes of the gas and liquid with respect to distance from the input well is represented by the curve ABCD in FIGURE 3—the abscissa of this curve being the distance from the input well and the ordinate being the percent of liquid in the liquid-gas mixture. While the liquid is represented to be in the bottom of the reservoir and the gas in the top, it is to be understood that this is merely for the purpose of a quantitative representation. In practice, the two phases appear to exist in about the same proportions at the top and bottom of the reservoir; the ratio varying only as the distance from the input well.

It has also been found that the length of the transition zone in a low-pressure operation, as indicated by the distance Z, varies with the distance from the input well. That is, whereas, the pure liquid L.P.G. band 16 and the front of the transition zone 17 move through the reservoir at a rate proportional to the amount of scavenging gas injected into the reservoir, the rear or trailing end of the transition zone may move only about 5%–50% as fast. The amount of fluid in the transition zone of a low-pressure system thus gradually increases as the zone progresses through the reservoir.

When the point A on curve ABCD, the point of gas breakthrough or the start of the two-phase region, reaches the producing well, some of the scavenging gas will be produced. As the transition zone 17 moves further, the gas/L.P.G. ratio increases until eventually the permeability to gas is so high and the permeability to liquid is so low that L.P.G. recovery is uneconomical and some of the L.P.G. has to be left in the reservoir or recovered slowly by evaporation. A high pressure system is thus generally much more desirable than a low-pressure system.

In some cases, a reservoir may be too shallow or for other reasons, economical secondary recovery of the oil from a reservoir under the high pressure system may be impractical. In such cases by an embodiment of the low pressure process, this oil may be recovered economically.

This embodiment will now be described by reference to FIGURE 3. In an oil field that has been developed by a series of wells extending from one end of the field to the other, a well (or a row of wells) 21 may be used as an input well. Various wells (or rows of wells) 22, 23, 24, and 25 may extend linearly or radially out from the input well in series. A quantity of oil-miscible liquid solvent such as L.P.G. is injected into the input well 21 through line 27. This L.P.G. enters the reservoir 28 forming a transition zone 15 with the oil and then a pure L.P.G. zone 16 following the transition zone. When a quantity of L.P.G. has been injected into the reservoir sufficient to maintain a band of pure L.P.G. throughout the length of the reservoir, injection of L.P.G. is stopped. A scavenging gas such as natural gas which is predominantly methane gas, is then injected into the reservoir through the same input well. A transition zone 17 forms, in which the composition varies from 100 percent miscible liquid at the leading end to 100 percent natural gas at the trailing end. The variation in liquid saturation is indicated by curve ABCD as described above.

As the oil bank ahead of transition zone 15 passes any of the wells 22, 23, 24 or 25, these wells may be used as producing wells and oil may be recovered therefrom. After the oil bank and the pure L.P.G. zone 16 has passed any well such as well 23 and the two-phase zone has arrived at the well, it may be produced as by flowing. Production from any well in this two-phase region will be a mixture of L.P.G. and natural gas. This mixture may be withdrawn from the second transition zone to decrease the length of the zone. The mixture or its components may then be used elsewhere or destroyed. Preferably, the L.P.G. is separated in separator 31 from the natural gas. The L.P.G. may be recovered for use elsewhere or it may be reinjected into the reservoir, preferably into the pure L.P.G. zone through line 32 and well 24 as that zone passes the well. The scavenging gas which is separated from the mixture may be used elsewhere or recycled to an input well, either well 21 or well 22 through line 33. By this means the trailing end of the L.P.G.-scavenging gas transition zone may be made to move at about the same rate as the leading end and the length of the transition zone may be shortened by the distance Z–Y. Obviously, the amount of L.P.G. required to maintain a zone of pure L.P.G. between the reservoir oil and the scavenging gas may thus be decreased appreciably.

In another embodiment of my invention, the reservoir is finally left full of water by displacing the oil solvent with water. Where water follows the solvent, the solvent is preferably at least about 50 percent soluble in water. Thus, for example, in a two-step displacement process where the oil is driven by the solvent and the solvent is driven by water, the solvent is soluble to a major extent in both oil and water. Examples of such solvents are acetone, ethyl alcohol, isopropyl alcohol, n-propyl alcohol, alkyl alcohol, diacetone, alcohol, butyl Cellosolve, butyl carbitol, dioxane, and the like. Isopropyl alcohol is preferred for a number of reasons including availability and cost. I have found in this regard that complete miscibility between the driving solvent and driven oil is not an absolute necessity, since a similar phenomenon appears to exist; the leading edge of the partially miscible displacing fluid appears to function somewhat like a completely miscible fluid displacement— a fluid displacement in which the driving fluid displaces the driven fluid with a narrow transition zone. High miscibility of a driving and a driven liquid is always preferred, however, since the transition zone is shorter the more miscible the two liquids. Thus, it can be seen that, while in some cases it may be desirable to employ a solvent which is completely miscible in all proportions with the reservoir oil, a solvent only partially miscible with the oil may be used to advantage in some cases. When this solvent is then displaced with water, the same phenomenon occurs. Being at least partially miscible with water, the majority of the solvent is displaced by frontal drive, and the solvent remaining in the pores of the formation becomes dispersed in the water, producing a transition zone 12 with the solvent concentration gradually decreasing within a short distance to zero.

In this embodiment in which the scavenging fluid is water, the process is thus substantially equivalent to an embodiment of the process employing gas as the scavenging fluid—the only difference being the difference in solvent. The amount of solvent depends upon the same factors as in the case of gas displacement. In general, however, with liquid displacement of liquid, the transition zone is thinner. The amount of solvent may also, as in the case of gas displacement, be determined approximately by simulating a length of the formation at the surface and injecting selected solvents on a trial basis. As water is injected into the input well, this band of solvent is driven toward the producing well, displacing substantially all of the oil in its path, and the solvent is displaced by the scavenging water, leaving the reservoir pores substantially completely filled with the scavenging water.

In still another embodiment of the process wherein the reservoir pores are eventually left full of gas, it is sometimes desirable, in order to reduce the amount of solvent required, to inject into the input well, either prior to the injection of the solvent or, in some cases, simultaneously with or intermittently with the injection of the solvent, a substantial quantity of water. Since water is practically universally found in small quantities, e.g., from about 15 to 50 percent of the pore space, in oil-producing reservoirs, this additional water tends to increase the water permeability of the reservoir some, as above described, but primarily the effect of the water is to add to the water conent of the pores of the rock so that a smaller amount of oil solvent is required to produce a frontal drive and effect the removal of the isolated oil droplets in the reservoir.

Thus, it will be apparent that my invention is susceptible of a great variety of embodiments and is capable of many modifications. Such embodiments and modifications as may be construed to fall within the scope and meaning of the appended claims are also considered to be within the spirit and intent of this invention.

I claim:

1. A method of recovering oil from a subterranean oil reservoir comprising the steps of injecting into said reservoir a quantity of a liquid miscible with said oil, said quantity of miscible liquid being sufficient to form a first transition zone with said oil and then to provide a band of substantially pure miscible liquid in said reservoir at all times behind said first transition zone as said oil is driven through the pores of said reservoir, injecting into said reservoir behind said miscible liquid a quantity of a scavenging fluid which is substantially more soluble in said liquid than in said oil to displace said band of miscible liquid through said reservoir and provide a zone of substantially pure scavenging fluid behind a second transition zone between said miscible liquid and said scavenging fluid, and withdrawing a mixture of said miscible liquid and said scavenging fluid from said second transition zone producing a well located in said reservoir within said second transition zone, whereby the length of said second transition zone is substantially reduced.

2. A method according to claim 1 in which at least a part of the miscible liquid is separated from said mixture and injected into said band of substantially pure miscible liquid by injecting said miscible liquid into a well located in said reservoir within said band of substantially pure miscible liquid.

3. A method according to claim 1 in which at least a part of the scavenging fluid is separated from said mixture and injected into said zone of substantially pure scavenging fluid by injecting said scavenging fluid into a well located in said reservoir within said zone of substantially pure scavenging fluid.

4. A method according to claim 1 in which said miscible liquid and said scavenging fluid in said mixture are separated, said separated miscible liquid is injected into said band of substantially pure miscible liquid by injecting said miscible liquid into a well located in said reservoir within said band of substantially pure miscible liquid and said separated scavenging fluid is injected into said zone of substantially pure scavenging fluid by injecting said scavenging fluid into a well located in said reservoir within said zone of substantially pure scavenging fluid.

5. A method according to claim 1 in which said miscible liquid is L.P.G. and said scavenging fluid is a predominantly hydrocarbon gas.

6. A method for the secondary recovery of crude oil from a subterranean oil reservoir through a producing well which comprises the steps of: injecting a fluid solvent into said reservoir through an injection well, said solvent being characterized by a substantial degree of miscibility with said crude oil, said solvent being liquefiable at the temperature of said reservoir and being injected in an amount between about 3 percent and about 10 percent by volume of the pore volume of said reservoir to be traversed by said solvent whereby to produce within said reservoir in the neighborhood of said injection well an oil-solvent transition zone, a front or bank of crude oil, and a second bank contiguous to said transition zone consisting essentially of said solvent; maintaining a pressure within said reservoir during injection of said solvent above the vapor pressure of said solvent at the temperature of said reservoir, thereafter injecting into said reservoir through the injection well, at a pressure and in an amount sufficient to maintain and drive said solvent in the liquid state toward said producing well, a fluid drive agent which is miscible with said solvent and substantially immiscible with said crude oil under said temperature and pressure conditions in the reservoir; said drive agent being injected and maintained at a pressure additionally sufficient to form a single phase fluid second transition zone between said bank of solvent and said drive agent and withdrawing said crude oil from said producing well.

7. The method of claim 6 wherein said fluid solvent is L.P.G.

8. A method for the secondary recovery of crude oil from a subterranean oil reservoir through a producing well which comprises the steps of: injecting a fluid solvent into said reservoir through an injection well, said solvent being characterized by a substantial degree of miscibility with crude oil, said solvent being liquefiable at the temperature of said reservoir and being injected in sufficient amount to produce within said reservoir in the neighborhood of said injection well an oil-solvent transition zone, a front or bank of crude oil, and a second bank contiguous to said transition zone consisting essentially of said solvent; maintaining a pressure within said reservoir higher than the vapor pressure of said solvent at the temperature of said reservoir during injection of said solvent to establish said transition zone and said bank of said solvent in a liquid state; thereafter injecting into said reservoir through the injection well, at a pressure sufficient to maintain and drive said liquid bank toward said producing well, a fluid drive agent which is substantially immiscible with said crude oil under said temperature and pressure conditions in the reservoir, said solvent being miscible with said drive agent at the pressure and temperature conditions in said reservoir; said drive agent being injected and maintained at a pressurse additionally sufficient to form a single phase fluid second transition zone between said bank of solvent and said drive agent and withdrawing said crude oil from said producing well.

9. A method for the secondary recovery of crude oil from a subterranean oil reservoir through a producing well which comprises the steps of: injecting a fluid solvent into said reservoir through an injection well, said solvent being characterized by a substantial degree of miscibility with crude oil, said solvent being liquefiable at the temperature of said reservoir and being injected in sufficient amount to produce within said reservoir in the neighborhood of said injection well an oil-solvent transition zone, a front or bank of crude oil, and a second bank contiguous to said transition zone consisting essentially of said solvent; maintaining a pressure within said reservoir higher than the vapor pressure of said solvent at the temperature of said reservoir during injection of said solvent to establish said transition zone and said bank of said solvent in a liquid state; thereafter injecting into said reservoir through the injection well, at a pressure sufficient to maintain and drive said liquid bank of solvent toward said producing well, a normally gaseous drive agent which is substantially immiscible with said crude oil under said temperature and pressure conditions in the reservoir, said solvent being miscible with said drive agent at the pressure and temperature conditions in said reservoir; said drive agent being injected and maintained at a pressure additionally sufficient to form a single phase fluid second transition zone between said bank of solvent and said drive agent and withdrawing said crude oil from said producing well.

10. The method of claim 9 wherein said fluid solvent is L.P.G.

11. A method of recovering oil from a subterranean oil reservoir with water comprising the steps of injecting a liquid miscible with the oil in said reservoir and miscible with water into said reservoir and then displacing said liquid with water, said liquid being in volume between about 3 percent and 10 percent of the pore volume of said reservoir to be traversed by said liquid.

12. A method of recovering substantially all of the oil from a subterranean oil-producing reservoir having an input well and a producing well by displacing said oil to said producing well with a liquid piston of a liquid which is miscible with said oil and is a water-miscible organic solvent selected from the group consisting of acetone, isopropyl alcohol, n-propyl alcohol, allyl alcohol, diacetone alcohol, butyl Cellosolve, butyl carbitol, dioxane, and ethyl alcohol, comprising injecting into said input well at a pressure greater than its vapor pressure a quantity of said liquid which is miscible with said oil, said quantity of liquid being greater than about 3 percent but substantially less than the pore volume of said reservoir between said input and said producing well and then displacing said liquid through said reservoir to said producing well by injecting water into said input well at a pressure greater than said vapor pressure of said liquid whereby when substantially all of said oil and said liquid have been produced, said reservoir is left full of water.

13. In the injection of an injection fluid of the class consisting of aqueous liquids and gases through an injection well into a porous subsurface formation containing a non-wetting phase of residual petroleum hydrocarbon which substantially restricts the permeability of the formation to said injection fluid, the improvement which comprises increasing said permeability by forcing into said formation from the well bore a liquid solvent which is mutually soluble to water and to the non-wetting phase, continuing the injection of said solvent to form a continuous phase of said solvent with the non-wetting phase dissolved therein in a region about the well bore, injecting additional solvent from the well bore sufficient in amount to force the continuous phase of solvent and dissolved non-wetting material from the said region in said formation, thereby substantially displacing said dissolved non-wetting material from said region and thereafter injecting said injection fluid into said treated region at substantially increased permeability.

14. In the injection of a water stream through an injection well into a porous subsurface formation containing a non-wetting phase which is resistant to displacement by water flow and which substantially restricts the flow of water through the formation, the improvement which comprises removing said non-wetting phase and thereby increasing the permeability of the formation to water with a resulting substantial increase in the rate of water injection by forcing into the formation from the well bore a liquid solvent which is mutually soluble to water and to the non-wetting phase, containing said injection to form in a region about the well bore a continuous phase of said solvent with the non-wetting phase dissolved therein, injecting additional solvent to force the continuous phase of solvent and dissolved non-wetting material a substantial distance radially outwardly from the well bore into the formation thereby substantially displacing the non-wetting phase by said solvent in the pores of the treated region about the bore, and thereafter injecting water into said well bore in sufficient quantities to displace said solvent and saturate the said region in turn with water, and continuing said water injection at a substantially increased permeability.

15. A method of recovering crude oil from a subterranean oil reservoir through a producing well which comprises the steps of: injecting a normally liquid solvent into said reservoir through an injection well, said solvent being characterized by a substantial degree of miscibility with both crude oil and water, said solvent being injected in sufficient amount to produce within said reservoir in the neighborhood of said injection well an oil-solvent transition zone, a front or bank of crude oil, and a second bank contiguous to said transition zone consisting essentially of said solvent; maintaining a pressure within said reservoir higher than the vapor pressure of said solvent at the temperature of said reservoir during injection of said solvent to establish said transition zone and said bank of said solvent in a liquid state; thereafter injecting water into said reservoir through the injection well at a pressure sufficient to maintain and drive said liquid bank toward said producing well, said liquid solvent forming a second liquid transition zone with said injected water; and withdrawing said crude oil from said producing well.

16. A method of recovering oil from a subterranean oil reservoir with water comprising the steps of: injecting a liquid solvent into said reservoir through an injection well said solvent being characterized by being completely soluble in said crude oil and in water in all proportions, and being injected in sufficient amount to produce within said reservoir in the neighborhood of said injection well a bank of said crude oil, a two phase transition zone of mixtures of said solvent and said crude oil and said solvent and naturally occurring formation waters, a single phase mixture of said solvent, said crude oil and said formation waters and a bank of said solvent contiguous to said single phase mixture; thereafter injecting water into said reservoir through said injection well at a pressure sufficient to drive said banks and said two phase and single phase mixtures toward said producing well; and withdrawing said crude oil from said producing well.

(References on following page)

References Cited

UNITED STATES PATENTS

| | | | |
|---|---|---|---|
| 1,101,605 | 6/1914 | Wright | 166—7 |
| 1,826,371 | 10/1931 | Spindler | 166—10 |
| 2,308,414 | 1/1943 | Campbell | 166—42 |
| 2,341,500 | 2/1944 | Detling | 166—8.55 |
| 2,402,588 | 6/1946 | Andresen | 166—10 |
| 2,412,765 | 12/1946 | Buddrus et al. | 166—7 |
| 2,609,051 | 9/1952 | Brownscombe | 166—7 |
| 2,623,596 | 12/1952 | Whorton et al. | 166—7 |
| 2,669,306 | 2/1954 | Teter et al. | 166—9 |
| 2,669,307 | 2/1954 | Mulholland et al. | 166—9 |
| 2,670,801 | 3/1954 | Sherborne | 166—9 |
| 2,724,437 | 11/1955 | Whorton et al. | 166—7 |
| 2,724,438 | 11/1955 | Whorton et al. | 166—9 X |

STEPHEN J. NOVOSAD, *Primary Examiner.*

CHARLES E. O'CONNELL, BENJAMIN B. BENDETT, JACOB L. NACKENOFF, *Examiners.*

T. A. ZALENSKI, R. I. SMITH, W. S. McCURRY, *Assistant Examiners.*

UNITED STATES PATENT OFFICE
CERTIFICATE OF CORRECTION

Patent No. 3,354,953  Dated November 28, 1967

Inventor(s) Richard A. Morse

It is certified that error appears in the above-identified patent and that said Letters Patent are hereby corrected as shown below:

Col. 6, line 71, change "alkyl" to -- allyl -- ; same line, change "diacetone, alcohol" to -- diacetone alcohol -- .

Col. 10, line 23, change "containing" to -- continuing -- .

SIGNED AND
SEALED
OCT 28 1969

(SEAL)
Attest:

Edward M. Fletcher, Jr.
Attesting Officer

WILLIAM E. SCHUYLER, JR.
Commissioner of Patents